United States Patent
Agerstam et al.

(10) Patent No.: US 9,860,677 B1
(45) Date of Patent: Jan. 2, 2018

(54) INTERNET-OF-THINGS GATEWAY COORDINATION

(71) Applicant: Intel Corporation, Santa Clara, CA (US)

(72) Inventors: Mats Agerstam, Portland, OR (US); Robert A. Colby, Granite Bay, CA (US); Vijay Sarathi Kesavan, Portland, OR (US); Douglas K. Hudson, Hillsboro, OR (US); Joseph L. Morrow, Portland, OR (US); Shilpa A. Sodani, Portland, OR (US); Sashi Kumar Penta, Hillsboro, OR (US); Thuyen C. Tran, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/282,276

(22) Filed: Sep. 30, 2016

(51) Int. Cl.
| | |
|---|---|
| *H04B 7/00* | (2006.01) |
| *H04W 4/00* | (2009.01) |
| *H04L 29/08* | (2006.01) |
| *H04W 88/16* | (2009.01) |
| *H04W 84/18* | (2009.01) |

(52) U.S. Cl.
CPC ............ *H04W 4/005* (2013.01); *H04L 67/10* (2013.01); *H04W 84/18* (2013.01); *H04W 88/16* (2013.01)

(58) Field of Classification Search
CPC .. G06F 21/44; H04L 61/1511; H04L 61/3025; H04L 61/305; H04W 4/005; H04W 4/008; H04W 4/028; H04W 4/04
USPC ......... 455/500, 3.01, 3.05, 420, 436, 453, 9, 455/41.1, 518, 519; 709/226, 217, 223; 370/312; 726/28, 6; 713/171, 168; 707/798; 705/333
See application file for complete search history.

(56) References Cited

U.S. PATENT DOCUMENTS

| | | | | |
|---|---|---|---|---|
| 7,653,465 | B1 * | 1/2010 | Geiger | .................... B61L 3/127 701/19 |
| 8,588,991 | B1 * | 11/2013 | Forbes, Jr. | ............. G05B 19/02 700/286 |
| 2006/0029007 | A1 | 2/2006 | Ayyagari | |
| 2008/0144524 | A1 | 6/2008 | Hershey et al. | |
| 2013/0097317 | A1 | 4/2013 | Sheleheda et al. | |
| 2014/0068317 | A1 * | 3/2014 | Kanigicherla | ........ G06F 9/5011 714/2 |
| 2014/0359131 | A1 * | 12/2014 | Seed | ...................... H04L 47/125 709/226 |
| 2015/0026044 | A1 | 1/2015 | Refaeli | |
| 2015/0134801 | A1 * | 5/2015 | Walley | ................ H04L 41/0893 709/223 |
| 2015/0134954 | A1 * | 5/2015 | Walley | .................... H04L 63/08 713/168 |
| 2015/0373481 | A1 * | 12/2015 | Eom | ...................... H04W 4/005 370/329 |

(Continued)

OTHER PUBLICATIONS

PCT International Search Report, PCT Application No. PCT/US2017/048342, dated Nov. 20, 2017, 3 pages.

*Primary Examiner* — Tan H Trinh
(74) *Attorney, Agent, or Firm* — International IP Law Group, P.L.L.C.

(57) ABSTRACT

An Internet of Things (IoT) system and method including IoT sensors to measure data and forward the data to gateway devices, the gateway devices to receive the data and provide the data to a cloud infrastructure, and a coordinator to assign ownership of the IoT sensors to the gateway devices.

22 Claims, 11 Drawing Sheets

(56) References Cited

U.S. PATENT DOCUMENTS

| | | | |
|---|---|---|---|
| 2015/0381737 A1* | 12/2015 | Quinn | H04L 67/12 709/217 |
| 2016/0081082 A1* | 3/2016 | Cao | H04W 76/025 370/329 |
| 2016/0085594 A1* | 3/2016 | Wang | H04W 4/005 709/226 |
| 2016/0088049 A1* | 3/2016 | Seed | G06F 9/541 709/203 |
| 2016/0094421 A1* | 3/2016 | Bali | H04L 43/04 709/223 |
| 2016/0127460 A1* | 5/2016 | Ding | H04W 4/06 370/312 |
| 2016/0182170 A1* | 6/2016 | Daoura | H04H 20/59 455/3.01 |
| 2016/0203234 A1* | 7/2016 | Piccand | G06F 17/30917 707/798 |
| 2016/0205078 A1* | 7/2016 | James | H04L 63/0442 713/171 |
| 2016/0205097 A1* | 7/2016 | Yacoub | H04L 63/0876 726/6 |
| 2016/0205106 A1* | 7/2016 | Yacoub | H04L 61/1511 726/28 |
| 2016/0241999 A1* | 8/2016 | Chin | H04W 4/021 |
| 2016/0248871 A1* | 8/2016 | Seed | H04L 61/1511 |
| 2016/0259932 A1* | 9/2016 | Lakshmanan | G06F 21/44 |
| 2016/0269972 A1* | 9/2016 | Taneja | H04W 40/246 |
| 2016/0285717 A1* | 9/2016 | Kim | H04L 43/0823 |
| 2016/0301695 A1* | 10/2016 | Trivelpiece | H04L 63/0435 |
| 2016/0351036 A1* | 12/2016 | Saldin | G08B 13/2491 |
| 2016/0379165 A1* | 12/2016 | Moakley | G06Q 10/0833 705/333 |
| 2017/0013062 A1* | 1/2017 | Kim | H04L 67/125 |
| 2017/0034688 A1* | 2/2017 | Kim | H04W 8/005 |

* cited by examiner

100

Centralized Coordination
400

Cooperative Coordination
500

Decentralized Coordination
600

INTERNET-OF-THINGS GATEWAY COORDINATION

TECHNICAL FIELD

The present techniques relate generally to Internet of Things (IoT) and, more particularly, to gateway-to-gateway coordination in an IoT system.

BACKGROUND

One view of the internet is the connection of clients, such as personal computers, tablets, smart phones, servers, digital photo-frames, and many other types of devices to publicly-accessible data-centers hosted in server farms. However, this picture represents a small portion of the overall usage of the globally-connected network. A very large number of connected resources currently exist, but are not publicly accessible. Examples include corporate networks, private organizational control and monitoring networks spanning the globe, and peer-to-peer relays designed for anonymity.

The Internet of Things (IoT) may bring Internet connectivity to as many as 50 billion devices by 2020. For organizations, IoT devices may provide opportunities for monitoring, tracking, or controlling other devices and items, including further IoT devices, other home and industrial devices, items in manufacturing and food production chains, and the like. Further, the emergence of IoT networks has served as a catalyst for profound change in the evolution of the internet. In the future, the internet is likely to evolve from a primarily human-oriented utility to an infrastructure where humans may eventually be minority actors in an interconnected world of devices.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
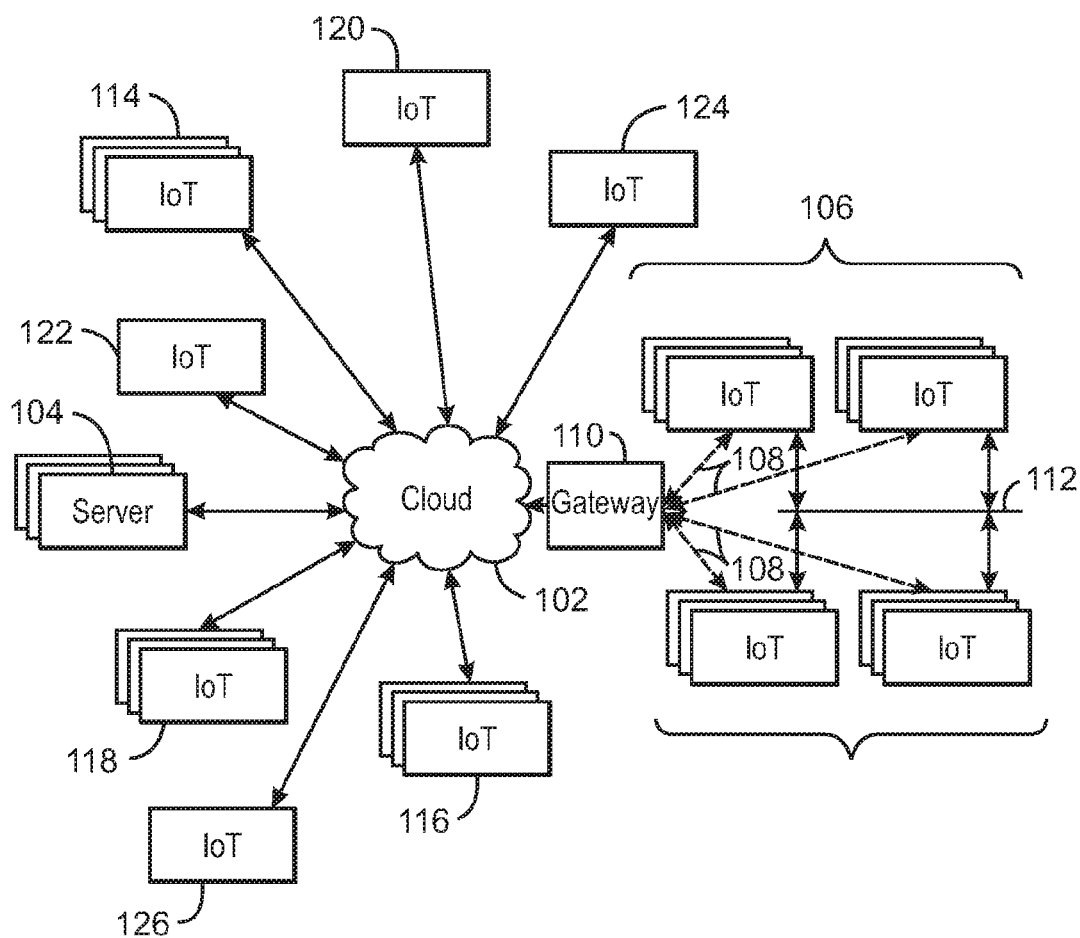
FIG. 1 is a drawing of a cloud computing network, or cloud, in communication with a number of Internet of Things (IoT) devices in accordance with embodiments of the present techniques.

The present techniques are directed to an IoT system including IoT sensors to measure data and forward the data to gateway devices. The gateway devices receive the data and may provide the data, for example, to a cloud infrastructure. In operation, the gateway devices and/or IoT sensors decide and assign ownership of the IoT sensors to the gateway devices. In one example, the IoT system has a communication channel between the gateway devices, wherein the gateway devices implement a centralized coordination to decide and assign ownership of the IoT sensors to the gateway devices. This centralized coordination may rely on a coordination protocol among the gateway devices. In another example, the IoT system has the communication channel among the gateway devices but wherein both the gateway device and the IoT sensors implement a cooperative coordination to decide and assign ownership of the IoT sensors to the gateway devices. The cooperative coordination may rely on a coordination protocol among the gateway devices and on beacons from the IoT sensors. In yet another example, the IoT sensors implement a decentralized coordination to decide and assign ownership of the IoT sensors to the gateway devices, and in which the gateway devices may not directly participate in deciding the ownership. With this decentralized option, the IoT sensors may rely on a beacon from the gateway devices in the IoT devices deciding the ownership.

Moreover, in certain embodiments, the gateways can generally support multiple wireless technologies including a heterogeneous network. That is, if a gateway device has multiple interfaces, the gateway device can manage/interact with sensor nodes that use Bluetooth® low energy (BLE), IEEE standard 802.15.4, etc. That said, a gateway device-to-gateway device handoff may take into account the capabilities of other gateway devices. Moreover, a gateway ownership of a sensor or set of sensors may mean the gateway has responsibility for relaying and reporting data from the sensor or set of sensor nodes. Yet, ownership may not always be fully comprehended by the system and ambiguities may arise as multiple gateways report data from the same sensors, unnecessary increased traffic load on the system, and the like. Further, as discussed below, ownership of a sensor by a gateway device may not be constant. Ownership mechanisms implemented herein may promote system management and efficiency, and may be orthogonal sensor functionality. Further, in addition to upward reporting from sensor to gateway devices, a gateway device may communicate to a sensor and wherein ownership may reduce over-the-air traffic. Lastly, various factors such as quality metrics, signal strength, load balancing, etc., may be taken into when ownership decisions are made.

Conventional implementations of IoT-like solutions in industrial spaces typically employ a wired interface connector for gateway-to-sensor connections as a work around of wireless limitations. In contrast, while embodiments herein may employ wired connections, the techniques can give a methodology for a coordination function to benefit major IoT infrastructure that employs a wireless sensor network (WSN) in a public, commercial, or industrial setting. Such may be beneficial for industrial settings where the number of sensors and gateways may typically be large in comparison, for example, to a home setting. Indeed, scalability may conventionally be a challenge in industrial or commercial IoT systems. Moreover, advantageously, the present coordination may be implemented by the gateways and/or sensors, autonomous of the cloud or central managing infrastructure.

As indicated, the techniques may include methodologies and architectures that allow sensor devices to be managed or "owned" by one gateway (GW) at any given time, e.g., owned by exactly one GW at a given time. The ownership of a sensor device may be an ephemeral property and can be transferred from one GW to another GW based on a variety of criteria such as proximity, load balancing, GW fault detection, and other conditions.

The number of wireless IoT sensor networks (WSNs) in the world may continue to grow in an explosive rate as more value continues to be derived from WSNs. As the number of nodes and gateways participating in the WSN grows, the advantage of a coordination function between these gateways, as provided with the present techniques, becomes increasingly beneficial. The techniques may include a framework for gateway-to-gateway coordination in industrial IoT systems. The coordination may involve tracking with respect to assets such as nodes including sensors and actuators.

Indeed, the techniques may provide for gateway-to-gateway coordination of sensor tracking and edge analytic functions. Thus, the gateway or gateway device in the IoT system may be uniquely employed as more than a data aggregator and forwarder. The gateway may additionally facilitate the coordination functionality which may reduce bandwidth utilized to communicate with a cloud or central location. Further, the IoT system may be self-organizing. Moreover, while the techniques are not limited to an industry standard, certain embodiments may implement the Open Connectivity Foundation™ (OCF) standard or other standards, including in a public, commercial, or industrial IoT setting.

A function of the IoT gateway (GW) is to receive data from the sensor devices, communicate with cloud-based servers to upload individual or aggregated sensor data, receive security keys, etc. GWs also communicate with other GWs to provide load balancing of sensor platforms, sensor platform handoff, data aggregation and filtering, and exchange of sensor platform encryption keys, and so forth. Each IoT gateway may be participating in a cluster of wireless sensor nodes, and is typically beneficial that the overall system operates effectively. Furthermore, GWs may be resource-rich devices and capable of applying machine learning (ML) techniques to the data received from the sensor platforms to offer analytical capabilities. This application of GWs may be desirable so that the analysis of the raw sensor data can be performed at the "leaf" boundary instead of passing the sensor data up to a central server in a cloud.

The ability of GWs to coordinate among themselves help to realize self-organizing IoT networks at the network periphery with de-centralized intelligence (i.e., not cloud-centric). Therefore, communication bandwidth required to a cloud, as well as system power consumption, distributed computing, etc. may all be generally reduced. In sum, certain embodiments herein are coordination functions solutions. At least three different examples of coordination solutions are discussed. Other example implementations are contemplated and applicable. As presented in more detail below, example implementations include centralized (or node-agnostic) coordination, co-operative coordination, decentralized (or node-managed) coordination, and so on.

The centralized coordination (or sensor-agnostic coordination) may employ an inter-GW protocol (communication between GWs) for the GWs collectively to determine ownership of the available nodes (sensors, actuators, etc.). The signaling protocol between the GWs can be an existing IoT standard (e.g. ©CF) or proprietary. In a centralized-coordination implementation (e.g., FIG. 4), the sensor devices may be unaware of their GW. In other words, a given sensor may not know which GW is their owner (or which GW tracks the sensor).

As for cooperative coordination (e.g., FIG. 5), the IoT sensors may participate in the GWs determination of GW ownership of sensors. In operation with respect to determining ownership, the GWs may leverage payloads in periodic unsolicited control traffic, e.g., beacons, the sensor devices emit for data reporting. The wireless technology for transmitting the periodic beacons can be, for example, Bluetooth® low energy or other low-powered, short-range wireless technology that offers beaconing capability. The GWs may use the reserved payload in the beacons to assign its GW ownership and tracking of a sensor, along with ownership transfer criteria. If a more suitable GW becomes available, the more suitable GW can claim the sensor ownership by connecting to the sensor and writing its GW ownership and ownership transfer criteria to the sensor.

For decentralized or distributed coordination (e.g., FIG. 6), in the distributed managed coordination, the sensor devices manage their ownership to a GW independently from the centralized GW network. The sensors make their decisions on which GW should be tracking/owning a sensor based on, for example, similar ownership criteria as in the previously described models.

Figure 2:
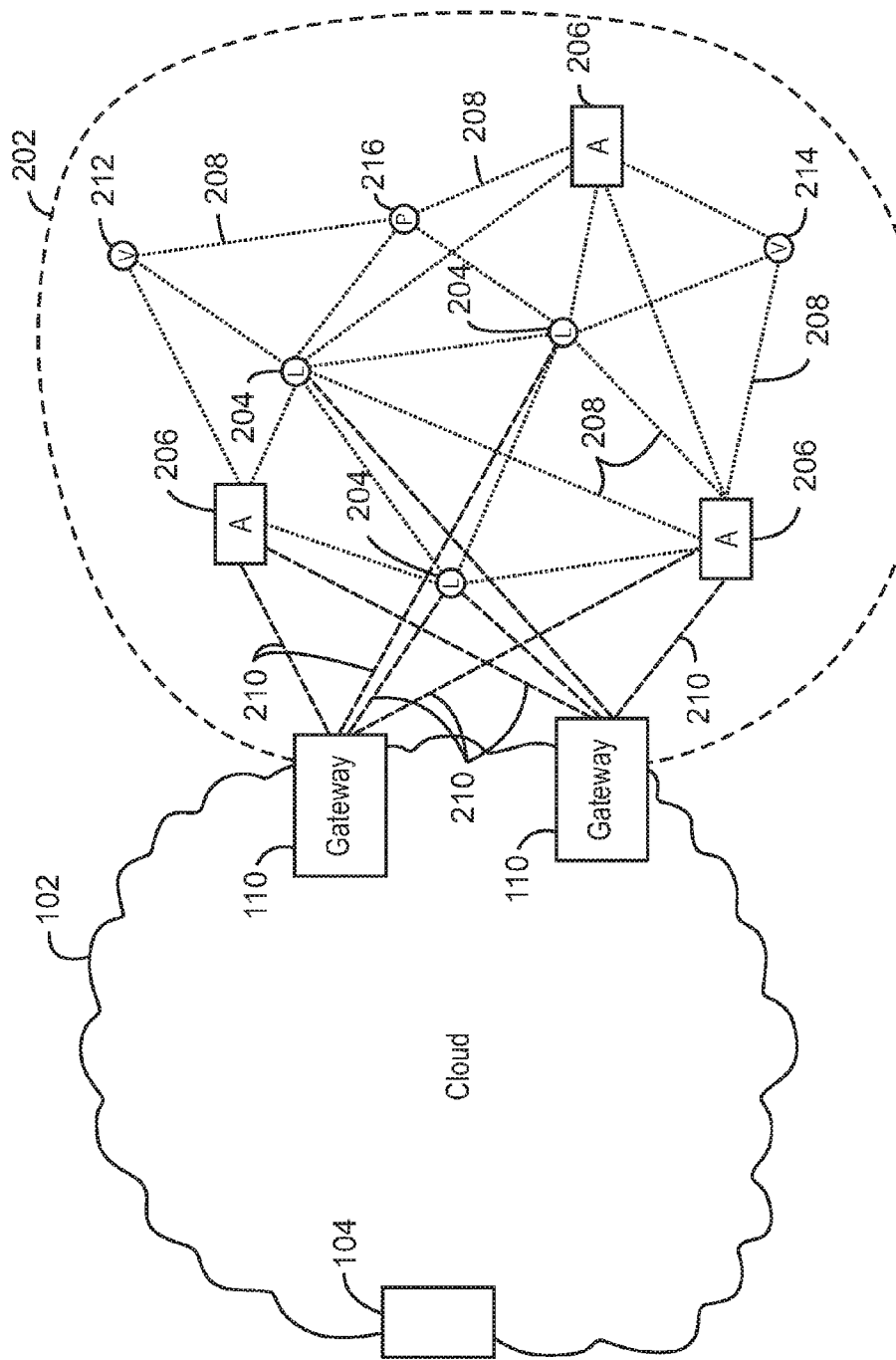
FIG. 2 is a drawing of a cloud computing network, or cloud, in communication with a mesh network of IoT devices, which may be termed a fog device, operating at the edge of the cloud in accordance with embodiments of the present techniques.
Figure 4:
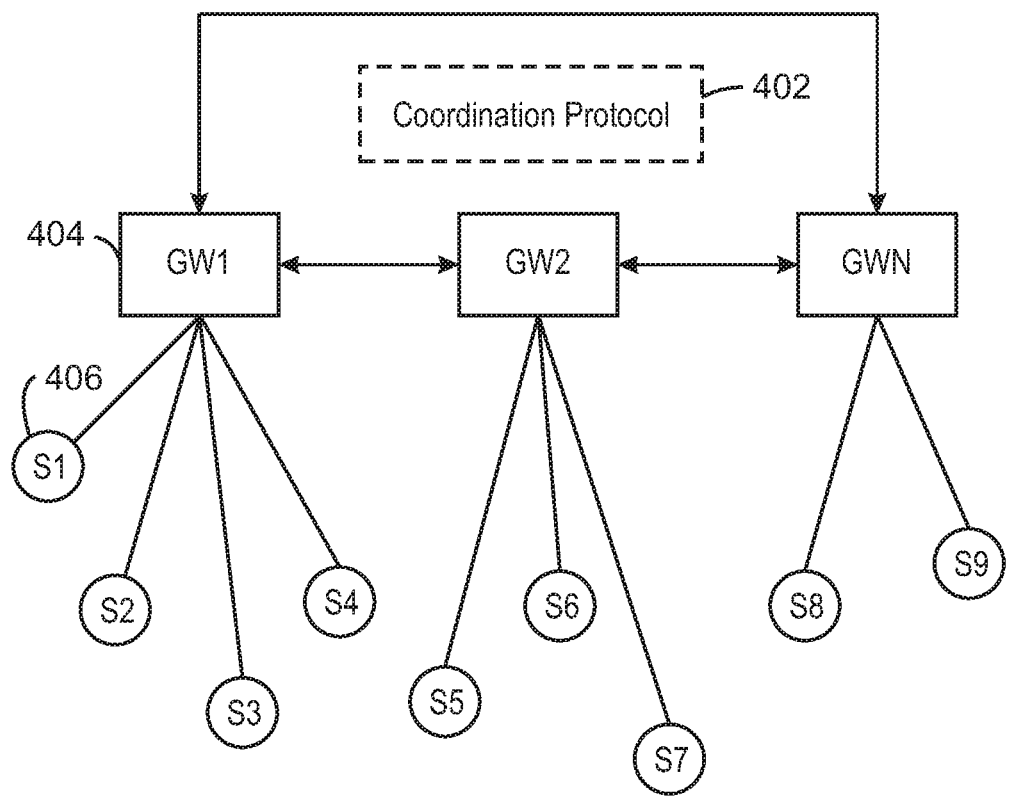
FIG. 4 is a diagram of IoT network employing centralized coordination for gateway ownership of sensors in accordance with embodiments of the present techniques.
Figure 5:
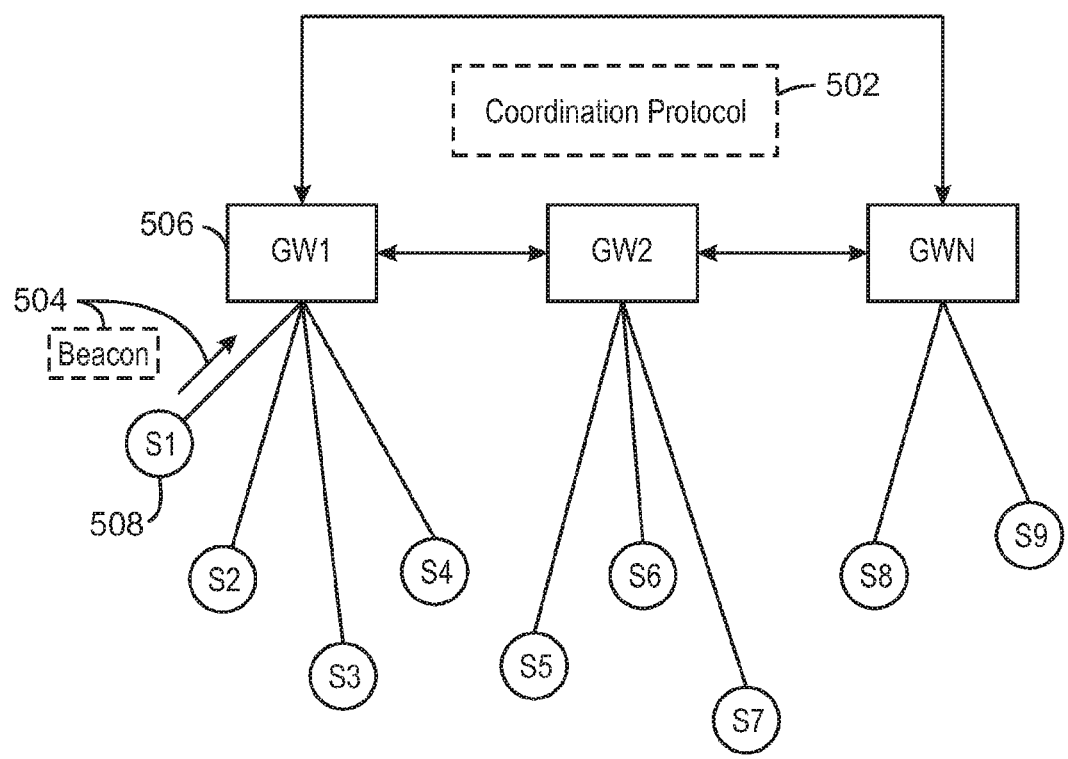
FIG. 5 is a diagram of IoT network employing cooperative coordination for gateway ownership of sensors in accordance with embodiments of the present techniques.
Figure 6:
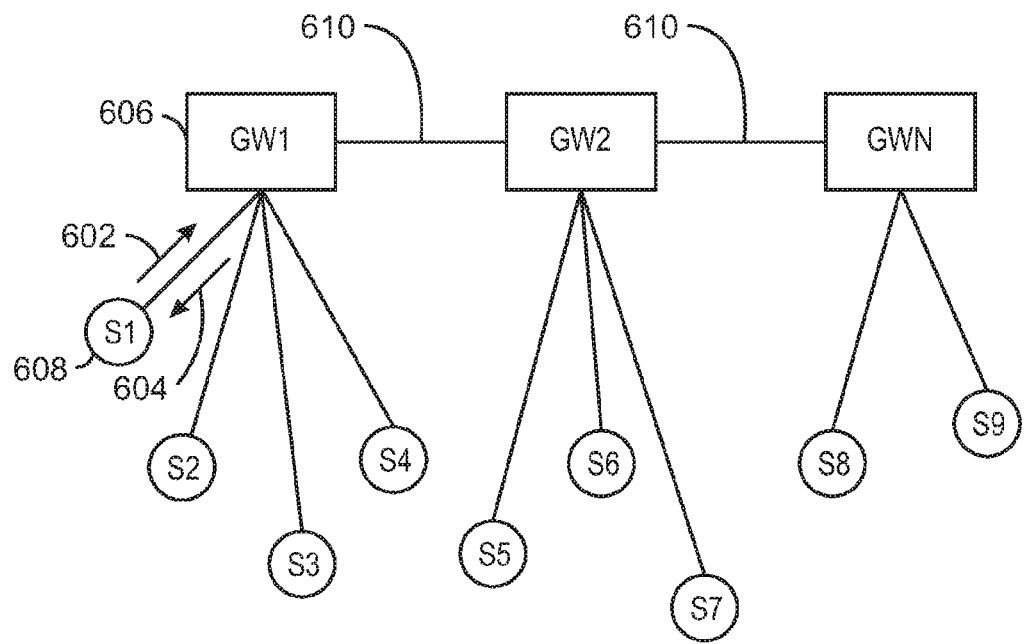
FIG. 6 is a diagram of IoT network employing decentralized coordination for gateway ownership of sensors in accordance with embodiments of the present techniques.

FIGS. 1 and 2 present example overall topology and architecture IoT systems and encompassing coordination of GW ownership of IoT sensors. FIGS. 4-6 present examples of such coordination of GW ownership of IoT sensors.

In general, the internet of things (IoT) includes a paradigm in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, factory automation, smart building, asset tracking/logistics, Operation Technology (OT) with industrial/factory networks, and the like. The IoT devices may be accessible through remote computers, servers, and other systems, for example, to control systems or access data.

The future growth of the Internet may include very large numbers of oT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 1 and 2.

FIG. 1 is a drawing of a cloud computing network, or cloud 102, in communication with a number of Internet of Things (IoT) devices. The cloud 102 may represent the Internet, or may be a local area network (LAN), or a wide area network (WAN), such as a proprietary network for a company. The cloud 102 may be in contact with one or more servers 104 that may provide command and control functions or consume data from the IoT devices. The IoT devices may include any number of different types of devices, grouped in various combinations. For example, a traffic control group 106 may include IoT devices along streets in a city. These IoT devices may include stoplights, traffic flow monitors, cameras, weather sensors, and the like. The traffic control group 106, or other subgroups, may be in communication with the cloud 102 through wireless links 108, such as low power wide area (LPWA) links, and the like. Further, a wired or wireless sub-network 112 may allow the IoT devices to communicate with each other, such as a local area network, wireless local area network, and the like. The IoT devices may use another device, such as a gateway 110, which may function as an aggregator or aggregation device, to communicate with the cloud 102.

Other groups of IoT devices may include temperature sensors 114, remote weather stations 116, alarm systems 118, automated teller machines 120, alarm panels 122, or moving vehicles, such as emergency vehicles 124 or drones 126, among many others. Each of these IoT devices may be in communication with other IoT devices, with servers 104, or both.

As can be seen from FIG. 1, a large number of IoT devices may be communicating through the cloud 102. This may allow different IoT devices to request or provide information to other devices autonomously. For example, the traffic control group 106 may request a current weather forecast from a group of remote weather stations 116, which may provide the forecast without human intervention. Further, an emergency vehicle 124 may be alerted by an automated teller machine 120 that a burglary is in progress. As the emergency vehicle 124 proceeds towards the automated teller machine 120, it may access the traffic control group 106 to request clearance to the location, for example, by turning traffic lights to red to block cross traffic at an intersection in sufficient time for the emergency vehicle 124 to have unimpeded access to the intersection.

Clusters of IoT devices, such as the remote weather stations 116 or the traffic control group 106, may be equipped to communicate with other IoT devices as well as with the cloud 102. This may allow the IoT devices to form an ad-hoc network between the devices, allowing them to function as a single device, which may be termed a fog device discussed further with respect to FIG. 2.

FIG. 2 is a drawing 200 of a cloud computing network, or cloud 102, in communication with a mesh network of IoT devices, which may be termed a fog device 202, operating at the edge of the cloud 102. Like numbered items are as described with respect to FIG. 1. In this example, the fog device 202 is a group of IoT devices at a street intersection. The fog device 202 may be established in accordance with specifications released by the OpenFog Consortium (OFC), among others. These specifications allow the formation of a hierarchy of computing elements between the gateways 110 coupling the fog device 202 to the cloud 102 and endpoint devices, such as the traffic lights 204 and the data aggregators 206 in this example.

Traffic flow through the intersection may be controlled by three traffic lights 204 in this example. Analysis of the traffic flow and control schemes may be implemented by aggregators 206 that are in communication with the traffic lights 204 and each other through a mesh network. Data may be uploaded to the cloud 102, and commands may be received from the cloud 102, through gateways 110 that are in communication with the traffic lights 204 and the aggregators 206 through the mesh network.

Any number of communications links may be used in the fog device 202. Shorter-range links 208, for example, compatible with IEEE 802.15.4 may provide local communications between IoT devices that are proximate to the intersection. Longer-range links 210, for example, compatible with LPWA standards, may provide communications between the IoT devices and the gateways 110. To simplify the diagram, not every communications link 208 or 210 is labeled with a reference number.

The fog device 202 may be considered to be a massively interconnected network wherein a number of IoT devices are in communications with each other, for example, by the communication links 208 and 210. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, routing protocol for low-power (RPL), the optimized link state routing (OLSR) protocol, or the better approach to mobile ad-hoc networking (B.A.T.M.A.N.), among many others.

Communications from any IoT device may be passed along the most convenient path between any of the IoT devices to reach the gateways 110. In these networks, the number of interconnections provide substantial redundancy, facilitating communications to be maintained, even with the loss of a number of IoT devices.

Not all of the IoT devices may be permanent members of the fog device 202. In the example in the drawing 200, three transient IoT devices have joined the fog device 202, a first vehicle 212, a second vehicle 214, and a pedestrian 216. In these cases, the IoT device may be built into the vehicles 212 and 214, or may be an App on a cell phone carried by the pedestrian 216.

The fog device 202 of the devices may be presented to clients in the cloud 102, such as the server 104, as a single device located at the edge of the cloud 102. In this example, the control communications to specific resources in the fog device 202 may occur without identifying any specific IoT device within the fog device 202. Accordingly, if an IoT device fails, other IoT devices may be able to discover and control a resource. For example, the traffic lights 204 may be wired so as to allow any one of the traffic lights 204 to control lights for the other traffic lights 204.

In some examples, the IoT devices may be configured using an imperative programming style, e.g., with each IoT device having a specific function and communication partners. However, the IoT devices forming the fog device 202 may be configured in a declarative programming style, allowing the IoT devices to reconfigure their operations and communications, such as to determine needed resources in response to conditions, queries, and device failures. This may be performed as transient IoT devices, such as the pedestrian 216, join the fog device 202. As the pedestrian 216 is likely to travel more slowly than the vehicles 212 and 214, the fog device 202 may reconfigure itself to ensure that the pedestrian 216 has sufficient time to make it through the intersection. This may be performed by forming a temporary group of the vehicles 212 and 214 and the pedestrian 216 to control the traffic lights 204. If one or both of the vehicles 212 or 214 are autonomous, the temporary group may instruct the vehicles to slow down prior to the traffic lights 204.

As the transient devices 212, 214, and 216, leave the vicinity of the intersection the fog device 202, it may reconfigure itself to eliminate those IoT devices from the network. As other transient IoT devices approach the intersection, the fog device 202 may reconfigure itself to include those devices.

The fog device 202 may include the traffic lights 204 for a number of intersections, such as along a street, along with all of the transient IoT devices along the street. The fog device 202 may then divide itself into functional units, such as the traffic lights 204 and other IoT devices proximate to a single intersection. This type of combination may enable the formation of larger IoT constructs in the fog device 202. For example, if an emergency vehicle joins the fog device 202, an emergency construct, or virtual device, may be created that includes all of the traffic lights 204 for the street, allowing control of the traffic flow patterns for the entire street. The emergency construct may instruct the traffic lights 204 along the street to stay red for opposing traffic and green for the emergency vehicle, expediting the passage of the emergency vehicle. Lastly, many other similar and different configurations and applications unrelated to vehicular traffic are relevant and applicable.

Figure 3:
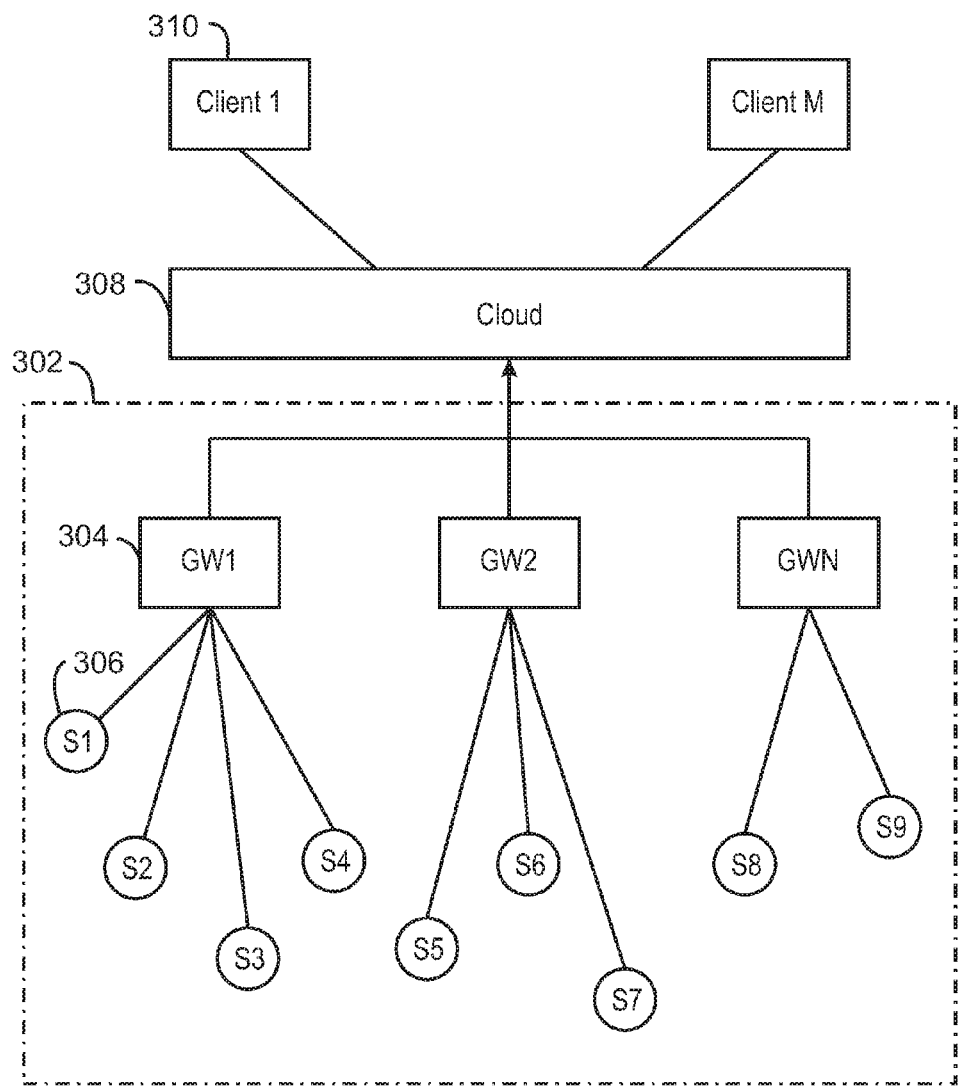
FIG. 3 is a diagram of a IoT system having an IoT network of sensors and gateway devices in accordance with embodiments of the present techniques.

FIG. 3 depicts an ontology of a GW and sensor system including for wireless sensing networking. The GWs and sensor network may be a low-powered, low-bandwidth, and high-latency network. For examples with an intra-GW protocol, the protocol may be proprietary or per a published standard such the OCF standard. In other examples, the GWs may not be connected to each other.

Multiple GWs may be employed in a GW/sensor network in an IoT system in a public, commercial, government, or industrial setting. Therefore, coordination between the GWs may be useful. As discussed below with respect to FIGS. 4-7, different techniques for the GW coordination may be configured and implemented to meet the performance metrics mandated by a specific IoT deployment. Each technique or solution may have trade-offs (e.g., Table 1 below) with respect to scalability, performance, memory requirements, and reliability. The various coordination examples described herein may be used during different phases of the deployment or run-time phase based on external triggers and signaling to facilitate correct operations of the system. A system integrator can choose and select one or more of these solutions/techniques based on the system requirements and other factors.

In the coordination (or prior to the coordination) between GWs and sensor devices, the system may scan for discovery of available devices. GWs can employ various mechanisms to discover not only sensor platforms but other GWs as well. Discovery techniques for sensor platforms can include received signal strength indicator (RSSI), Time of Flight (TCF), global positioning system (GPS) or other location services, and ultrasound, or combinations of multiple techniques. Challenges may be associated with each of the techniques. For example, RSSI can fluctuate due to obstructions and local RF environment. GPS can accurately pinpoint location but may be cost-prohibitive for some implementations. However, the coordination techniques may be implemented generally with any of the aforementioned discovery techniques.

In particular, FIG. 3 is an IoT system 300 having an IoT network 302 including gateway devices (GW) 304 and IoT sensor devices (sensors) 306. It should be noted that while the number of sensors 306 is arbitrarily depicted as nine for clarity, the number of sensors 306 is generalized as X and with each gateway device 304 parenting Yi number of sensors so that the sum of Yi over the N number of gateways devices 304 is equal to X number of sensors 306 total.

Both the gateway devices 304 and the sensors 306 may be computing devices. The IoT network 302 may also include IoT actuators or actuator devices. The number of gateway devices 304 is N. Again, the number of IoT sensors 306 is X and arbitrarily depicted as nine (S1 to S9) for simplicity. In general, the nine or X sensors 306 may communicate with each other and with each gateway 304 (GW1 to GWN). In the illustrated example at the given moment in time, the sensors S1-S4 are associated with (e.g., assigned to or owned by) the gateway GW1, the sensors S5-S7 are associated with the gateway GW2, and the sensors S8 and S9 are associated with the gateway GWn.

The sensor devices 306 (S1 to S9 or Sx) may be leaf nodes. In a particular example, the sensor devices 306 use low-power, short-range radio-frequency (RF) technology to communicate with the gateway 304 GW currently owning the particular Sx node. The gateways 304 GW1 to GWn may form a second level tier of connectivity or a GW network, and bridge the connection from the sensors 306 to a cloud 308 infrastructure and cloud services. Indeed, the gateway devices 304 are coupled to the cloud 308. The cloud 308 may be on premise or external. The cloud 308 infrastructure may provide numerous services for the network 302 and for external clients 310. The number of clients 308 is 1 to M. The clients 308 may be consumers of the data collected via the IoT sensors, gateway devices 304, and any cloud infrastructure. The clients 308 may be computing devices of customers, administrators, end-users, and so on. In certain embodiments, the gateways 306 and the clients 310 connect to the cloud 308 infrastructure over an application programming interface (API). The API may be some representational state transfer (REST or RESTful) API such as Hypertext Transfer Protocol (HTTP), HTTP secured (HTTPS), or similar.

FIG. 3 illustrates how the available sensor nodes are associated or owned by a particular GW at a given moment. FIGS. 4-7 present the three coordination functions, respectively, outlined earlier in more detail in terms of sensor ownership can be transferred from one GW to another and what the trade-offs are with each example mechanism. There are numerous reasons for why a coordination function is valuable to keep track of sensor devices. An overall goal of these coordination functions may be to meet system level requirements in terms of reliability, scaling (sensor to GW density), load balancing, mobility/hand-off and fault/error detection (of either GWs or sensor devices), and the like.

Conversely, in the absence of a coordinating function among GWs, the burden of assigning ownership of sensors to GW falls on the cloud generally requiring communicating additional state information (of GW and sensors) and thus resulting in communication overhead and system latency. This may be particularly true if the reporting is connectionless, e.g. because multiple GW may be tracking a given node which may result in inconsistencies, redundant and increased traffic loads, etc. Alternately, the notion of ownership of sensors can be eliminated which results in redundant data at the cloud since multiple GWs send the same information on sensors. These issues become severe in dense sensor deployments or deployment where the GWs and/or the sensor are mobile (e.g., logistics, drones) leading to overall system instability, inefficiency, or underutilization.

FIG. 4 is an IoT network 400 employing centralized coordination for gateway ownership of sensors. The network 400 has a coordination protocol 402 between the gateways 404. The gateways 404 determine gateway ownership of the sensors 406. Thus, FIG. 4 illustrates the centralized coordination function. In this scenario, the GWs 404 form their own intra-GW communication channel such as over internet protocol or IP. A GW 404 that manages a specific sensor device 406 is said to "own" that sensor device 406. In the illustrated embodiment, each GW 404 owns a set of sensor devices 406 and also additionally looks for other candidate sensor devices 406 in proximity.

Indeed, a GW 404 may seek sensors 406 it does not own by scanning over the low-power, low-range wireless protocol used between sensor devices and gateways. The protocol may be Bluetooth® Low Energy or Institute of Electrical and Electronics Engineers (IEEE) 802.15.4 stack such as with ZigBee, WirelessHART, and Thread specifications. The IEEE standard 802.15.4 generally intends to offer the lower network layers of a type of wireless personal area network (WPAN) which focuses on low-cost, low-speed, ubiquitous communication between devices. It can be contrasted with other approaches, such as Wi-Fi, which offer more bandwidth and require more power. The emphasis is on very low cost communication of nearby devices with little to no underlying infrastructure. The 802.15.4 standard, for example, is designed to run on very low-voltage hardware, such as might be found in an embedded device that runs on battery power for months or even years. This may be true for LE as well. However, the scaling of the 802.15.4 standard may be better due to 6TiSCH and the meshing capabilities and scheduling opportunities for traffic that might offer a better spectrum efficiency.

A particular example of a WPAN is designed to function with a roughly 10-meter antenna range, and various transfer speeds from 20 kbps up through 250 kbps. In addition to working with low-power hardware, the standard is written to accommodate easy-to-manufacture and inexpensive devices.

Moreover, at least two classes of nodes may be defined: full-function computing devices and reduced-function devices (RFDs) such as embedded sensor devices. RFDs can generally communicate directly with full-function devices, so that the beefier hardware of the full-function devices (servers, personal computers, some gateway devices, etc.) can shoulder the burden of managing the network, routing messages, and other overhead. Such a network node can also define a synchronization schedule, which helps keep the RFDs from colliding with each other by defining fixed, predictable slots for transmitting data packets. This network node can send out regular beacon messages to help the RFDs keep time by simply listening for the beacon whenever the RFDs need to transmit.

In any case, the coordination protocol discussed with respect to FIG. 4 generally allows each GW 404 to have a holistic view of all of the sensor devices 406, including which GW currently owns a specific sensor device as well as a quality metric that can be used to make a decision to hand-off ownership from one GW to another. Examples of a quality metric include received signal strength, bit rate, packet identification, desired load balancing among the sensors, and other parameters.

The coordination protocol may allow a GW 404 to request ownership of a specific sensor device 406 if the that GW 404 deems to more efficiently and reliably be able to track that sensor device 406. A GW 404 may also request for another GW 404 in the GW network to take ownership of a specific or a set of sensor devices 406 if the GW detects that the quality or spectrum efficiency tracking that sensor device 406 is deteriorating. The spectrum efficiency may be related to how air time is being used for wireless communication.

GWs 406 can also request a load balancing of sensor devices 406 to be performed to more equally distribute the resources required to manage all of the sensors in the WSN. The GWs generally have a processor and memory storing code (e.g., instructions, logic) executable by the processor to perform the aforementioned actions.

FIG. 5 is an IoT network 500 configured to employ cooperative coordination for gateway ownership of sensors. The network 500 utilizes a coordination protocol 502 among the gateway devices 506, as discussed above with respect to FIG. 4, but also relies on a beacon 504 emitted by the sensor devices 508. In this cooperative mode, available bandwidth beaconing (broadcast/multicast) data from the sensor devices 508 helps with the coordination function for the GWs 506 to decide on initial ownership and ownership transitions. On the other hand, the beacon data from sensor devices 508 are typically limited and for purposes to report sensor reporting to the GW 506. In contrast, with this coordination solution, the sensors 508 allow for a small amount of the allotted payload in beacons 504 to be assigned to the GW 506 for bookkeeping and tracking purposes.

This cooperative scheme helps offloading some of the management traffic between the individual GWs 506. The cooperative implementation may also help overcome situations where not feasible to rely on a permanent connection between all of the GWs 506 in the system either from a wireless perspective or by the mere fact that the GWs 506 may be on isolated domains and cannot reach each other. Moreover, a relay route via on premise cloud or external cloud (e.g., internet) may be costly.

In any case, the management portion of the beacons payload generally allows for GWs 506 to claim ownership of a sensor 508 tag to connect and request ownership. During this action, sensor devices 508 can employ optional authentication and authorization steps of the requesting GW 506.

Typically, the GW 506 includes its GW identifier along with current perceived quality metric of that node. Further, a first GW 506 may also include other parameters to help assist with an ownership transition to another GW 506 by indicating data about the first GW 506 load (# of sensor tags), current state of resource availability, and the like. Moreover, new candidate GWs 506 can request to claim ownership by inspection of the beacon 504 data to evaluate if the new candidate GW 506 is a better candidate to manage and track the specific sensor device than the GW 506 that is currently owner.

In certain embodiments, an ownership claim process can include by a GW 506 to: (1) discover the sensor device 508 connectionless (via beacon/advertisement frame); (2) parse the beacon 504 data and extract details of the current GW 506 owner for that sensor device; (3) connect to the sensor tag, which may include an optional authentication and authorization action (GW to sensor and vice versa—i.e. mutual authentication); and (4) request to take ownership of the sensor device 508 by sending a command that includes its own GW ID and other auxiliary data (e.g., quality metric, load, ownership transfer criteria, etc.).

Each GW 506 may periodically reconnect to its owned tags or nodes (e.g., sensors or actuators) to update the auxiliary data that helps other GWs 506 to make a decision as to whether they are a better candidate for owner of the specific sensor device 508. In some examples, a GW 506 may periodically connect to the node (e.g., sensor) for the purpose of establishing a "heart beat" or "keep alive." If the GW fails to re-connect to the node in a specified period of time, the node can assume that that the GW is out of range or has gone offline. If this occurs, the node can change its beacon to indicate that it is "not owned" so that the can be picked up by another GW. This should allow for a more robust network.

Further, in general, the GWs and sensors generally have a processor and memory storing code executable by the processor to perform the aforementioned actions with respect to coordination of GW ownership of the sensors. Lastly, the beacon-mode may be a non-connected state. However, the sensor devices 508 may provide the aforementioned coordination data to the GW 506 via a direct connection (or a connected state) with the GW 506 in lieu of or in addition to the beacon 504.

FIG. 6 is an IoT network 600 configured to employ decentralized coordination for gateway ownership of sensors. In the decentralized coordination mode, a new beacon 604 is introduced from the GWs 606 themselves. This beacon 604 helps the sensor devices 608 to making ownership decisions independently from the infrastructure as to which node or GW 606 should be owning them. The GW 606 beacons 604 may include the information needed by the sensor devices to make an informed decision as to whether an ownership transfer should be done to another more suitable GW 606. Each sensor device 608 can measure proximity to the closest GW 606 through path-loss (e.g. RSSI) but may need additional load/auxiliary information from the beacons in order to make a better or informed decision about ownership transition. Moreover, while lines 610 are depicted between the GWs 606, the GWs 606 in certain embodiments do not have to be connected for the network 600 to implement the decentralized coordination of GW ownership of the sensors 608.

The actions involved in ownership transition in this decentralized model may be: (1) GW 606 reports out periodic beaconing 604 information including its GW ID and other data that contributes to a decision about its GW load, available resources, health state, etc.; (2) sensor devices 608 broadcasts their own beaconing 602 information that contains information about their current owner GW 606; and (3) sensor devices 608 listens to GW 606 beacons 604 periodically and when time to find a more suitable GW 606 for ownership. Data from the beacon 604 frame itself along with data encapsulated in the beacon 604 payload may be used by the sensor 608. The actions may further include: (4) a sensor device 608 makes the transition to a GW 606 as owner by updating its own beacon 602 information indicating the new owner. Additionally, or optionally, the sensor device 608 may connect back to the GWs if a higher degree of quality of service (QoS) is needed and confirmation about ownership transfer is needed from the infrastructure.

Further, the sensors 608 generally have a processor and memory storing code executable by the processor to perform the aforementioned actions with respect to coordination of GW ownership of the sensors. Lastly, direct connections may be employed in lieu of or in addition to the beacons 602 and 604 to provide and exchange the aforementioned information to implement the decentralized coordination.

Table 1 below is a summary provides a snapshot of some of the tradeoffs between each approach that may be considered prior to a decision on the coordination model. The comments in the table are generalizations.

TABLE 1

Comparison of Coordination Techniques

|  | Centralized | Co-operative | Decentralized |
| --- | --- | --- | --- |
| Power Consumption* | Lower because generally no additional logic needed on sensors | Medium. Additional Processing implemented on sensing device | Higher. Sensor devices perform scanning, processing of beacons. |
| Spectrum Efficiency | Higher because low OTA overhead, Beaconing can be used best for sensor reporting | Medium. Some overhead with beacons but otherwise use intra-GW channel | Lower. Additional beacons on GW that consume airtime. |
| Scale | Good, but utilizes intact intra-GW channel which is higher resource implemented on GW in high-density deployments with large # sensors | Good, less dependency on intact intra-GW channel for mobility, load balancing flows, | Better in terms of offloading required resources and compute from GW to sensor devices but generally power consumption trade-off. |
| Interconnected Infrastructure | Yes | Yes | Not required between GWs |
| Sensor Agnostic | Yes | No | No |
| Infrastructure Agnostic | No | No | Can be |

*In certain examples, the power consumption may be from the sensor/node perspective. Power consumption on the GW may be greater.

With respect to additional benefits, as indicated, GW coordination may reduce dependency on the cloud and reduce the overall communication overhead in the system. In addition to monetary cost benefit, GW coordination can improve battery life in constrained devices. Also, GW coordination mechanisms, such as centralized and cooperative modes, can be leveraged to offload some of the repeated signaling between sensor and GW. For example, if a sensor is authenticated and verified as valid by a GW (based on the mechanism used this operation can be computationally intensive), the sensor does not have to repeat the process with subsequent GWs. As a part of the coordination function, the GW that owns the sensor can signal to the next GW that the GW is taking ownership that the sensor has been authenticated and verified eliminating or reducing need for repeating the procedure. Moreover, some embodiments of the techniques may be well-positioned to be included in the Open Connectivity Foundation (OCF) industrial task group. Other relevant organizations include OpenFog and Industrial Internet Consortium (IIC).

Lastly, the IoT system may be configured for a particular coordination model, such as when the IoT system is constructed or deployed. On the other hand, the IoT system may be configured to implement various coordination models, and with a selector capability to provide the system or an administrator to select the particular coordination model to employ at a given time.

Figure 7:
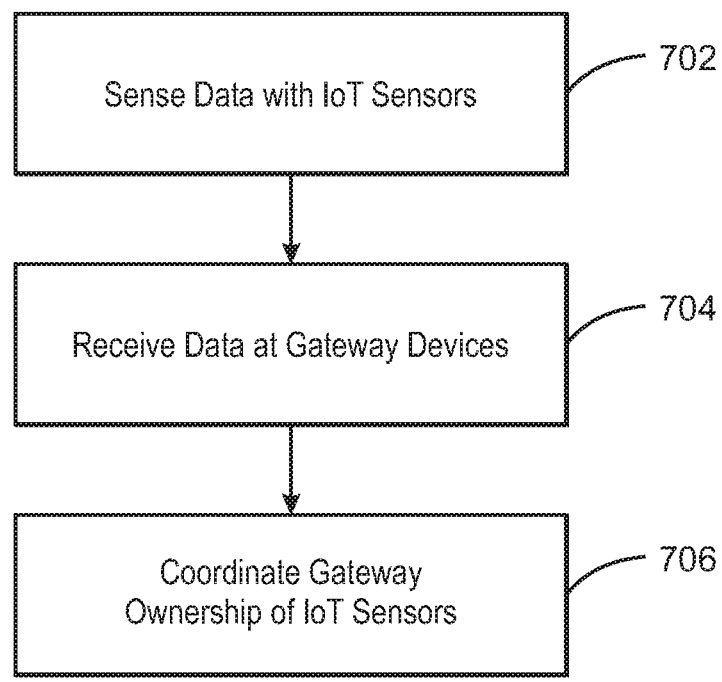
FIG. 7 is a block flow diagram of a method of operating an IoT system in accordance with embodiments of the present techniques.

FIG. 7 is a method 700 of operating an IoT system having a network of gateway devices and IoT sensor devices. At block 702, the method includes sensing or measuring data with the IoT sensors. At block 704, the method includes receiving at the gateway devices the data from the IoT sensors. The method may also include the gateway devices providing the data to a cloud such as a server in a cloud. The cloud may be on premise with the IoT system. Alternatively, the cloud may be external or remote to the IoT system, such as the internet or remote intranet, and so on. At block 706, the method includes coordinating gateway device ownership of the IoT sensors. The coordinating of gateway device ownership of the IoT sensors may include the gateway devices implementing a centralized coordination to decide and assign ownership of the IoT sensors to the gateway devices, the centralized coordination relying on a coordination protocol among the gateway devices. Alternatively, the coordinating of gateway device ownership of the IoT sensors, as referenced in block 706, may include the gateway devices and the IoT sensors implementing a cooperative coordination to decide and assign ownership of the IoT sensors to the gateway devices, the cooperative coordination relying on a coordination protocol among the gateway devices and on a beacon from the IoT sensors. Another option for coordinating gateway device ownership of the IoT sensors, as referenced in block 706, is the IoT sensors implementing a decentralized coordination to decide and assign ownership of the IoT sensors to the gateway devices. In examples, the gateway devices do not decide the ownership. The IoT sensors implementing the decentralized coordination may include the IoT sensors relying on a beacon from the gateway devices to decide the ownership.

In summary, a method of operating an IoT system may include sensing data with IoT sensors, receiving at gateway devices the data from the IoT sensors, and coordinating gateway device ownership of the IoT sensors. The coordinating of gateway device ownership of the IoT sensors may include the gateway devices implementing a centralized coordination to decide and assign ownership of the IoT sensors to the gateway devices, the centralized coordination relying on a coordination protocol among the gateway devices. The coordinating of gateway device ownership of the IoT sensors may include the gateway devices and the IoT sensors implementing a cooperative coordination to decide and assign ownership of the IoT sensors to the gateway devices, the cooperative coordination relying on a coordination protocol among the gateway devices and on a beacon from the IoT sensors. The coordinating of the gateway device ownership of the IoT sensors may include the IoT sensors implementing a decentralized coordination to decide and assign ownership of the IoT sensors to the gateway devices, and wherein the gateway devices do not decide the ownership in certain examples. The IoT sensors implementing the decentralized coordination may include the IoT sensors relying on a beacon from the gateway devices to decide the ownership. Lastly, the method may include selecting a coordination mode for coordinating gateway device ownership of the IoT sensors.

Figure 7A:
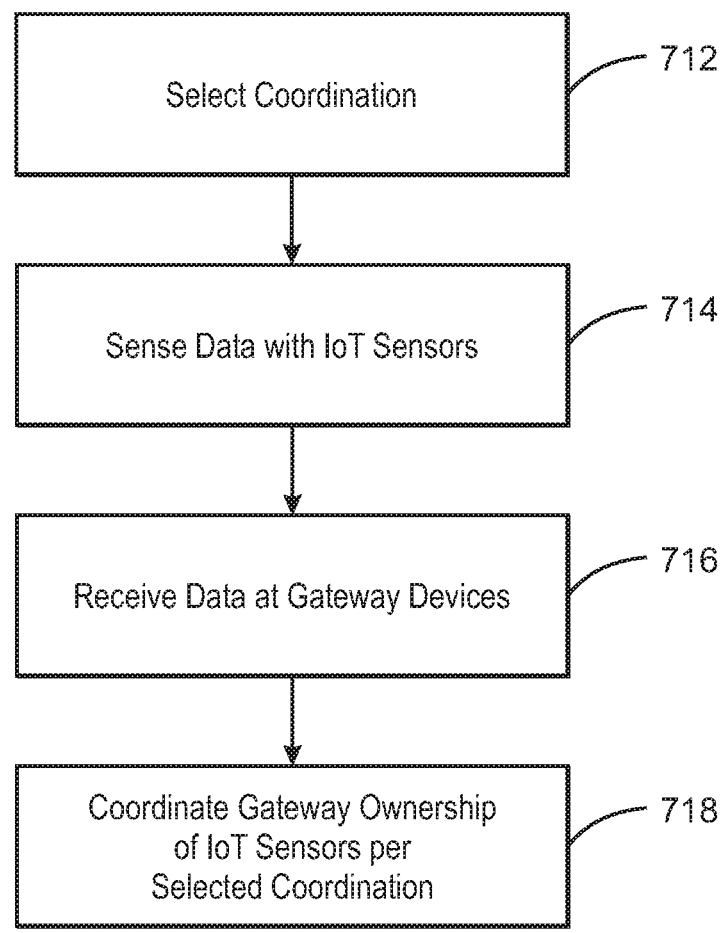
FIG. 7A is a block flow diagram of a method of operating an IoT system in accordance with embodiments of the present techniques.

FIG. 7A is a method 710 of operating an IoT system having a network of gateway devices and IoT sensor devices. At block 712, the method includes selecting a coordination option for coordinating gateway device ownership of the IoT sensors. The remaining depicted actions of method 710 are similar to the actions discussed with respect to method 700 of FIG. 7. At block 714, the IoT sensors sense or measure data. At block 716, the gateway devices receive the data from the IoT sensors. The method may also include the gateway devices providing the data to a cloud. At block 718, the method includes coordinating gateway device ownership of the IoT sensors per the coordination option selected at block 712.

Figure 8:
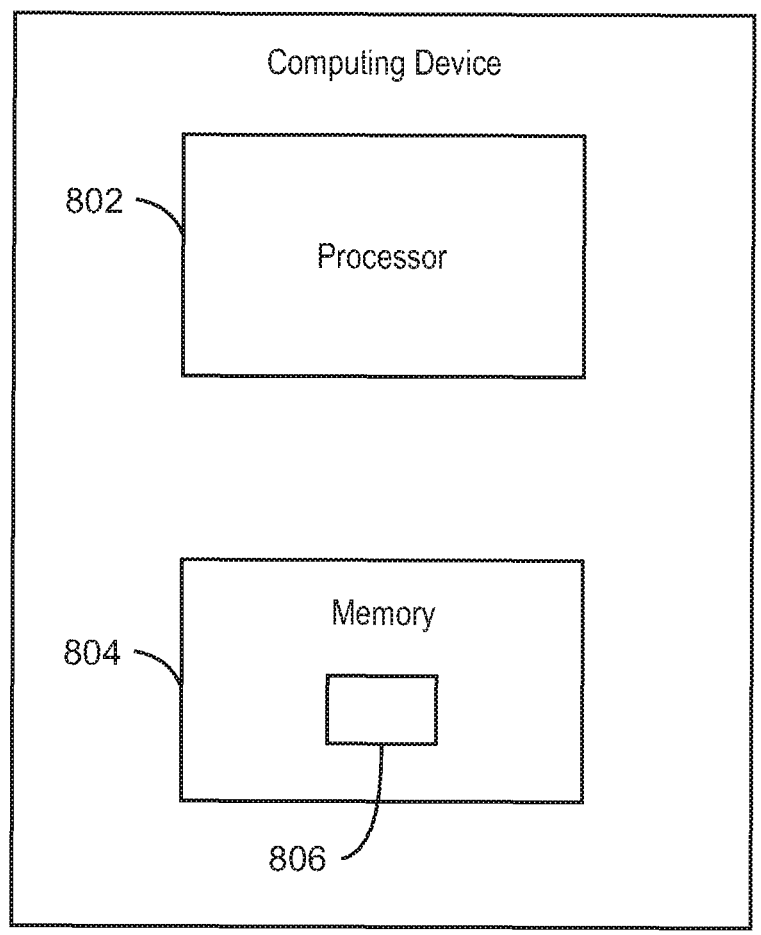
FIG. 8 is a diagram of a computing device for an IoT system in accordance with embodiments of the present techniques.

FIG. 8 is a computing device 800, such as a computing system, gateway device, sensor device, server, aggregation device, remote computer, and the like. While FIG. 8 depicts one computing device 800, embodiments may employ multiple computing devices 800. The computing 800 includes a processor or hardware processor 802 such as a microprocessor, a central processing unit or CPU, and so forth. The processor 802 may be multiple processors or each processor 202 may have multiple cores. The computing device 800 has memory 804, such as nonvolatile memory, volatile memory, and other types of memory. The nonvolatile memory may be a hard drive, read-only-memory or ROM, etc. The volatile memory may be random access memory or RAM, cache, etc.

In the illustrated example, the memory 804 stores code 806, e.g., instructions, logic, etc., executable by the one or more processors 802. The code 804 may be executed by the processor 804 to implement the gateway coordination techniques discussed herein. Further, respective actions may be implemented by different computing devices 800. Also, the computing device may include an application-specific integrated circuit (ASIC) customized for the techniques described.

Figure 9:
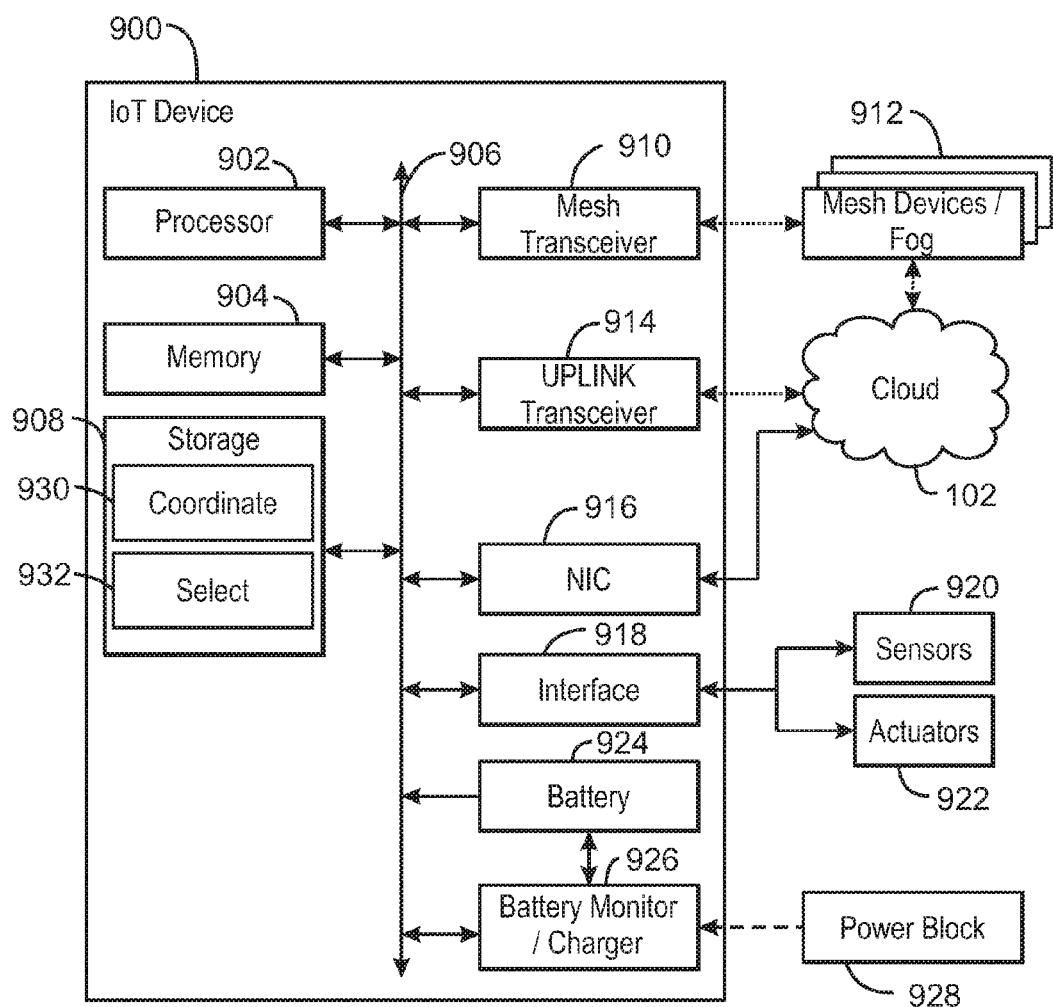
FIG. 9 is a diagram of a computing device for an IoT system in accordance with embodiments of the present techniques.

FIG. 9 is a block diagram of an example of components that may be present in an IoT device 900 for profiling or diagnostics of an IoT system. The IoT device 900 may include any combinations of the components shown in the example. The components may be implemented as ICs, portions thereof, discrete electronic devices, or other modules, logic, hardware, software, firmware, or a combination thereof adapted in the IoT device 900, or as components otherwise incorporated within a chassis of a larger system. The block diagram of FIG. 9 is intended to show a high level view of components of the IoT device 900. However, some of the components shown may be omitted, additional components may be present, and different arrangements of the components shown may occur in other implementations.

The IoT device 900 may include a processor 902, which may be a microprocessor, a multi-core processor, a multi-threaded processor, an ultra-low voltage processor, an embedded processor, or other known processing element. The processor 902 may be a part of a system on a chip (SoC) in which the processor 902 and other components are formed into a single integrated circuit, or a single package, such as the Edison™ or Galileo™ SoC boards from Intel. As an example, the processor 902 may include an Intel® Architecture Core™ based processor, such as a Quark™, an Atom™, an i3, an i5, an i7, or an MCU-class processor, or another such processor available from Intel® Corporation, Santa Clara, Calif. However, any number of other processors may be used, such as those available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 902 may communicate with a system memory 904 over a bus 906. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 908 may also couple to the processor 902 via the bus 906. To enable a thinner and lighter system design, the mass storage 908 may be implemented via a solid state disk drive (SSDD). Other devices that may be used for the mass storage 908 include flash memory cards, such as SD cards, microSD cards, xD picture cards, and the like, and USB flash drives. In low power implementations, the mass storage 908 may be on-die memory or registers associated with the processor 902. However, in some examples, the mass storage 908 may be implemented using a micro hard disk drive (HDD). Further, any number of new technologies may be used for the mass storage 908 in addition to, or instead of, the technologies described, such as resistance change memories, phase change memories, holographic memories, or chemical memories, among others. For example, the IoT device 900 may incorporate the 3D XPOINT memories from Intel® and Micron®.

The components may communicate over the bus 906. The bus 906 may include any number of technologies, including industry standard architecture (ISA), extended ISA (EISA), peripheral component interconnect (PCI), peripheral component interconnect extended (PCIx), PCI express (PCIe), or any number of other technologies. The bus 906 may be a proprietary bus, for example, used in a SoC based system. Other bus systems may be included, such as an I2C interface, an SPI interface, point to point interfaces, and a power bus, among others.

The bus 906 may couple the processor 902 to a mesh transceiver 710, for communications with other mesh devices 912. The mesh transceiver 910 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 912. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 910 may communicate using multiple standards or radios for communications at different ranges. For example, the IoT device 900 may communicate with close devices, e.g., within about 10 meters, using a local transceiver based on BLE, or another low power radio, to save power. More distant mesh devices 912, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 910 may be incorporated into an MCU as an address directly accessible by the chip, such as in the Curie® units available from Intel.

An uplink transceiver 914 may be included to communicate with devices in the cloud 102. The uplink transceiver 914 may be LPWA transceiver that follows the IEEE 802.15.4, or IEEE 802.15.4g standards, among others. The IoT device 900 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in IEEE 802.15.4e may be used.

Any number of other radio communications and protocols may be used in addition to the systems mentioned for the mesh transceiver 910 and uplink transceiver 914, as described herein. For example, the radio transceivers 910 and 912 may include an LTE or other cellular transceiver that uses spread spectrum (SPA/SAS) communications for implementing high speed communications, such as for video transfers. Further, any number of other protocols may be used, such as Wi-Fi networks for medium speed communications, such as still pictures, sensor readings, and provision of network communications.

The radio transceivers 910 and 914 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). Cellular standards such as LTE-machine-type communication (LTE-M), LTE-narrowband (LTE-NB), or variations thereof, may be applicable. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10) 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WIDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, rnmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 914, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 916 may be included to provide a wired communication to the cloud 102. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 916 may be included to allow connection to a second network, for example, a NIC 916 providing communications to the cloud over Ethernet, and a second NIC 916 providing communications to other devices over another type of network.

With respect to representation of NIC, uplink, and mesh transceiver, in the general case for QW node there may be at least two physical interfaces. One interface for the low power mesh (e.g. IEEE 802.15.4) which may have mesh and routing capability as part of the stack. A second physical interface may have internet protocol (IP) connectivity that performs the "uplink" reporting of data to a cloud entity.

The bus 906 may couple the processor 902 to an interface 918 that may be used to connect external devices. The external devices may include sensors 920, such as accelerometers, level sensors, flow sensors, temperature sensors, pressure sensors, barometric pressure sensors, and the like. The interface 918 may be used to connect the IoT device 900 to actuators 922, such as power switches, valve actuators, an audible sound generator, a visual warning device, and the like.

While not shown, various input/output (I/O) devices may be present within, or connected to, the IoT device 900. For example, a display may be included to show information, such as sensor readings or actuator position. An input device, such as a touch screen or keypad may be included to accept input.

A battery 924 may power the IoT device 900, although in examples in which the IoT device 900 is mounted in a fixed location, it may have a power supply coupled to an electrical grid. The battery 924 may be a lithium ion battery, a metal-air battery, such as a zinc-air battery, an aluminum-air battery, a lithium-air battery, and the like.

A battery monitor/charger 926 may be included in the IoT device 900 to track the state of charge (SoCh) of the battery 924. The battery monitor/charger 926 may be used to monitor other parameters of the battery 924 to provide failure predictions, such as the state of health (SoH) and the state of function (SoF) of the battery 924. The battery monitor/charger 926 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 926 may communicate the information on the battery 924 to the processor 902 over the bus 906. The battery monitor/charger 926 may also include an analog-to-digital (ADC) convertor that allows the processor 902 to directly monitor the voltage of the battery 924 or the current flow from the battery 924. The battery parameters may be used to determine actions that the IoT device 900 may perform, such as transmission frequency, mesh network operation, sensing frequency, and the like. This may be related back to the failure operations being performed discussed above.

A power block 928, or other power supply coupled to a grid, may be coupled with the battery monitor/charger 926 to charge the battery 924. In some examples, the power block 928 may be replaced with a wireless power receiver to obtain the power wirelessly, for example, through a loop antenna in the IoT device 900. A wireless battery charging circuit, such as an LTC4020 chip from Linear Technologies of Milpitas, Calif., among others, may be included in the battery monitor/charger 926. The specific charging circuits chosen depend on the size of the battery 924, and thus, the current required. The charging may be performed using the Airfuel standard promulgated by the Airfuel Alliance, the Qi wireless charging standard promulgated by the Wireless Power Consortium, the Rezence charging standard, promulgated by the Alliance for Wireless Power, among others.

The mass storage 908 may include a number of modules to implement the gateway coordination described herein, as indicated by reference numerals 930 and, 932. Block 930 may be executable code to implement the gateway coordination including different modes or types of gateway coordination. Block 932 may be select a mode of the gateway configuration the IoT system is to follow.

Although shown as code blocks in the mass storage 908, it may be understood that any of the modules may be replaced with hardwired circuits, for example, built into an application specific integrated circuit (ASIC). The mass storage 908 may further include and store other functional blocks, such as a control UI for accessing configuration parameters, and an automation framework that may provide application program interfaces (APIs) for the interaction of canned trigger scripts. Other functional blocks that may be present include accelerated processing units (APUs) in the automation framework that exchange a standard set of timing information that allows trigger scripts to identify synchronous versus staggered starts. An IoT database may be includes to store workflow configuration information, observed system performance, and resulting solution characteristics. Interactions with the IoT database may be via the control UI.

Figure 10:
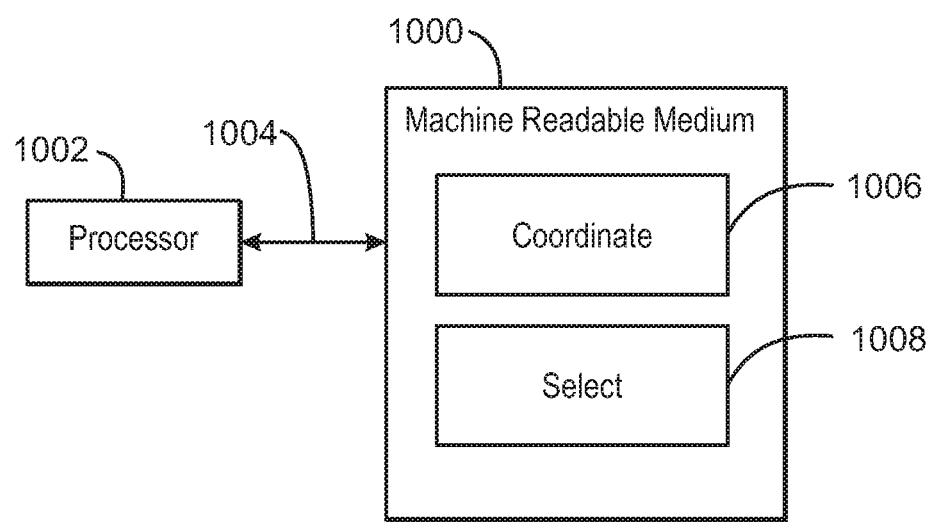
FIG. 10 is a block diagram illustrating a computer-readable medium to facilitate coordination of gateway ownership of IoT sensors in accordance with embodiments of the present techniques.

FIG. 10 is a block diagram depicting a tangible, non-transitory, computer-readable medium to facilitate profiling and diagnostics. The computer-readable medium 1000 may be accessed by a processor 1002 over a computer interconnect 1004. The processor 1002 may be an aggregation device processor, a sensor processor, a server processor, a remote computing device processor, or other processor. The tangible, non-transitory, computer-readable medium 100 may include executable instructions or code to direct the 1002 to perform the operations of the techniques described herein, such as to implement gateway coordination.

The various software components discussed herein may be stored on the tangible, non-transitory, computer-readable medium 1000, as indicated in FIG. 10. For example, a gateway coordination module 1006 (executable code/instructions) may direct the processor 1002 to implement coordination of gateway ownership of sensor devices in an IoT network. A selection module 1008 may direct the processor 1002 to select a mode or type of such gateway coordination for the IoT network to implement. It should be understood that any number of additional software components not shown in FIG. 10 may be included within the tangible, non-transitory, computer-readable medium 1000, depending on the application.

In the description and claims, the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit or receive signals, among others.

An embodiment is an implementation or example. Reference in the specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can", or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement or order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

Examples are provided. Example 1 is an Internet of Things (IoT) system. The system includes IoT sensors to measure data and forward the data to gateway devices; the gateway devices to receive the data and provide the data to a cloud infrastructure; and a coordinator to assign ownership of the IoT sensors to the gateway devices.

Example 2 includes the system of example 1, including or excluding optional features. In this example, the system includes a communication channel between the gateway devices, wherein the coordinator comprises the gateway devices to implement a centralized coordination to decide and assign ownership of the IoT sensors to the gateway devices, the centralized coordination to rely on a coordination protocol among the gateway devices.

Example 3 includes the system of any one of examples 1 to 2, including or excluding optional features. In this example; the system includes a communication channel between the gateway devices, wherein the coordinator comprises the gateway devices and the IoT sensors to implement a cooperative coordination to decide and assign ownership of the IoT sensors to the gateway devices. Optionally, the cooperative coordination to rely on a coordination protocol among the gateway devices and on a beacon from the IoT sensors.

Example 4 includes the system of any one of examples 1 to 3, including or excluding optional features. In this example, the coordinator comprises the IoT sensors to implement a decentralized coordination to decide and assign ownership of the IoT sensors to the gateway devices. Optionally, the coordinator does not comprise the gateway devices. Optionally, the gateway devices do not decide the ownership. Optionally, the IoT sensors rely on a beacon from the gateway devices to decide the ownership.

Example 5 includes the system of any one of examples 1 to 4, including or excluding optional features. In this example, the system includes a selector to facilitate selection of a coordination mode for the coordinator to assign ownership.

Example 6 is a method of operating an Internet of Things (IoT) system. The method includes sensing data with IoT sensors; receiving at gateway devices the data from the IoT sensors; and coordinating gateway device ownership of the IoT sensors.

Example 7 includes the method of example 6, including or excluding optional features. In this example, the method includes providing the data from the gateway devices to a server in a cloud.

Example 8 includes the method of any one of examples 6 to 7, including or excluding optional features. In this example, coordinating gateway device ownership of the IoT sensors comprises the gateway devices implementing a centralized coordination to decide and assign ownership of the IoT sensors to the gateway devices, the centralized coordination relying on a coordination protocol among the gateway devices.

Example 9 includes the method of any one of examples 6 to 8, including or excluding optional features. In this example, coordinating gateway device ownership of the IoT sensors comprises the gateway devices and the IoT sensors implementing a cooperative coordination to decide and assign ownership of the IoT sensors to the gateway devices, the cooperative coordination relying on a coordination protocol among the gateway devices and on a beacon from the IoT sensors.

Example 10 includes the method of any one of examples 6 to 9, including or excluding optional features. In this example, coordinating gateway device ownership of the IoT sensors comprises the IoT sensors implementing a decentralized coordination to decide and assign ownership of the IoT sensors to the gateway devices. Optionally, the gateway devices do not decide the ownership. Optionally, the IoT sensors implementing the decentralized coordination comprises the IoT sensors relying on communication from the gateway devices to decide the ownership. Optionally, the communication from the gateway devices is a beacon from the gateway devices.

Example 11 includes the method of any one of examples 6 to 10, including or excluding optional features. In this example, the method includes selecting a coordination mode for coordinating gateway device ownership of the IoT sensors.

Example 12 is a tangible, non-transitory, computer-readable medium comprising code executable by a processor of an IoT device to direct the processor to coordinate gateway device ownership of the IoT sensors, the IoT sensors to measure data and provide the data to gateway devices.

Example 13 includes the computer-readable medium of example 12, including or excluding optional features. In this example, to coordinate gateway device ownership of the IoT sensors comprises implementing a centralized coordination by the gateway devices to decide and assign ownership of the IoT sensors to the gateway devices, the centralized coordination relying on a coordination protocol among the gateway devices.

Example 14 includes the computer-readable medium of any one of examples 12 to 13, including or excluding optional features. In this example, to coordinate gateway device ownership of the IoT sensors comprises the gateway devices and the IoT sensors implementing a cooperative coordination to decide and assign ownership of the IoT sensors to the gateway devices, the cooperative coordination relying on a coordination protocol among the gateway devices and on a beacon from the IoT sensors.

Example 15 includes the computer-readable medium of any one of examples 12 to 14, including or excluding optional features. In this example, to coordinate gateway device ownership of the IoT sensors comprises the IoT sensors implementing a decentralized coordination to decide and assign ownership of the IoT sensors to the gateway devices.

Example 16 includes the computer-readable medium of any one of examples 12 to 15, including or excluding optional features. In this example, the gateway devices do not decide the ownership.

Example 17 includes the computer-readable medium of any one of examples 12 to 16, including or excluding optional features. In this example, the IoT sensors implementing the decentralized coordination comprises the IoT sensors relying on a beacon from the gateway devices to decide the ownership.

Example 18 includes the computer-readable medium of any one of examples 12 to 17, including or excluding optional features. In this example, code to direct the processor to facilitate selection of a coordination mode to coordinate the gateway device ownership of the IoT sensors.

Example 19 is an Internet of Things (IoT) system. The system includes IoT sensors to measure data and forward the data to gateway devices; the gateway devices to receive the data and provide the data to a cloud infrastructure; and a coordinator to assign ownership of the IoT sensors to the gateway devices.

Example 20 includes the system of example 19, including or excluding optional features. In this example, the system includes a communication channel between the gateway devices, wherein the coordinator comprises the gateway devices to implement a centralized coordination to decide and assign ownership of the IoT sensors to the gateway devices, the centralized coordination to rely on a coordination protocol among the gateway devices.

Example 21 includes the system of any one of examples 19 to 20, including or excluding optional features. In this example, the system includes a communication channel between the gateway devices, wherein the coordinator comprises the gateway devices and the IoT sensors to implement a cooperative coordination to decide and assign ownership of the IoT sensors to the gateway devices, and wherein the cooperative coordination to rely on a coordination protocol among the gateway devices and on communication from the IoT sensors. Optionally, the communication from the IoT sensors is a beacon from the IoT sensors.

Example 22 includes the system of any one of examples 19 to 21, including or excluding optional features. In this example, the coordinator comprises the IoT sensors to implement a decentralized coordination to decide and assign ownership of the IoT sensors to the gateway devices, wherein the coordinator does not comprise the gateway devices, wherein the gateway devices do not decide the ownership, and wherein the IoT sensors rely on communication from the gateway devices to decide the ownership. Optionally, the communication from the gateway devices is a beacon from the gateway devices.

Example 23 is a method of operating an Internet of Things (IoT) system. The method includes sensing data with IoT sensors; receiving at gateway devices the data from the IoT sensors; coordinating gateway device ownership of the IoT sensors; and providing the data from the gateway devices to a server in a cloud.

Example 24 includes the method of example 23, including or excluding optional features. In this example, coordinating gateway device ownership of the IoT sensors comprises the gateway devices implementing a centralized coordination to decide and assign ownership of the IoT sensors to the gateway devices, the centralized coordination relying on a coordination protocol among the gateway devices.

Example 25 includes the method of any one of examples 23 to 24, including or excluding optional features. In this example, coordinating gateway device ownership of the IoT sensors comprises the gateway devices and the IoT sensors implementing a cooperative coordination to decide and assign ownership of the IoT sensors to the gateway devices, the cooperative coordination relying on a coordination protocol among the gateway devices and on a beacon from the IoT sensors.

Example 26 includes the method of any one of examples 23 to 25, including or excluding optional features. In this example, coordinating gateway device ownership of the IoT sensors comprises the IoT sensors implementing a decentralized coordination to decide and assign ownership of the IoT sensors to the gateway devices, wherein the gateway devices do not decide the ownership. Optionally, the IoT sensors implementing the decentralized coordination comprises the IoT sensors relying on a beacon from the gateway devices to decide the ownership.

Example 27 is a tangible, non-transitory, computer-readable medium comprising code executable by a processor of an IoT device to direct the processor to coordinate gateway device ownership of the IoT sensors, the IoT sensors to measure data and provide the data to gateway devices.

Example 28 includes the computer-readable medium of example 27, including or excluding optional features. In this example, to coordinate gateway device ownership of the IoT sensors comprises implementing a centralized coordination by the gateway devices to decide and assign ownership of the IoT sensors to the gateway devices, the centralized coordination relying on a coordination protocol among the gateway devices.

Example 29 includes the computer-readable medium of any one of examples 27 to 28, including or excluding optional features. In this example, to coordinate gateway device ownership of the IoT sensors comprises the gateway devices and the IoT sensors implementing a cooperative coordination to decide and assign ownership of the IoT sensors to the gateway devices, the cooperative coordination relying on a coordination protocol among the gateway devices and on a beacon from the IoT sensors.

Example 30 includes the computer-readable medium of any one of examples 27 to 29, including or excluding optional features. In this example, to coordinate gateway device ownership of the IoT sensors comprises the IoT sensors implementing a decentralized coordination to decide and assign ownership of the IoT sensors to the gateway devices, wherein the gateway devices do not decide the ownership, and wherein the IoT sensors implementing the decentralized coordination comprises the IoT sensors relying on a communication from the gateway devices to decide the ownership.

Example 31 is an Internet of Things (IoT) system. The system includes means for sensing data with IoT sensors; means for receiving at gateway devices the data from the IoT sensors; and means for coordinating gateway device ownership of the IoT sensors.

Example 32 includes the system of example 31, including or excluding optional features. In this example, the system includes means for providing the data from the gateway devices to a server in a cloud.

Example 33 includes the system of any one of examples 31 to 32, including or excluding optional features. In this example, means for coordinating gateway device ownership of the IoT sensors comprises means for the gateway devices implementing a centralized coordination to decide and assign ownership of the IoT sensors to the gateway devices, the centralized coordination relying on a coordination protocol among the gateway devices.

Example 34 includes the system of any one of examples 31 to 33, including or excluding optional features. In this example, means for coordinating gateway device ownership of the IoT sensors comprises the gateway devices and the IoT sensors implementing a cooperative coordination to decide and assign ownership of the IoT sensors to the gateway devices, the cooperative coordination relying on a coordination protocol among the gateway devices and on a beacon from the IoT sensors.

Example 35 includes the system of any one of examples 31 to 34, including or excluding optional features. In this example, means for coordinating gateway device ownership of the IoT sensors comprises means for the IoT sensors implementing a decentralized coordination to decide and assign ownership of the IoT sensors to the gateway devices. Optionally, the gateway devices do not decide the ownership. Optionally, means for the IoT sensors implementing the decentralized coordination comprises means for the IoT sensors relying on communication from the gateway devices to decide the ownership. Optionally, the communication from the gateway devices is a beacon from the gateway devices.

Example 36 includes the system of any one of examples 31 to 35, including or excluding optional features. In this example, the system includes means for selecting a coordination mode for the means for coordinating gateway device ownership of the IoT sensors.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An Internet of Things (IoT) system comprising:
    IoT sensors to measure data and forward the data to gateway devices;
    the gateway devices to receive the data and provide the data to a cloud infrastructure;
    a coordinator to assign ownership of the IoT sensors to the gateway devices according to a coordination mode; and
    a selector to facilitate selection of the coordination mode for the coordinator to assign ownership, wherein selection options for the coordination mode comprise a centralized coordination, a cooperative coordination, and a decentralized coordination.

2. The IoT system of claim 1, comprising a communication channel between the gateway devices, wherein the coordinator comprises the gateway devices to implement the centralized coordination to decide and assign ownership of the IoT sensors to the gateway devices, the centralized coordination to rely on a coordination protocol among the gateway devices.

3. The IoT system of claim 2, wherein the coordination protocol among the gateway devices facilitates the gateway devices to request ownership of the IoT sensors, and wherein the coordination protocol is proprietary or per a published standard.

4. The IoT system of claim 1, comprising a communication channel between the gateway devices, wherein the coordinator comprises the gateway devices and the IoT sensors to implement the cooperative coordination to decide and assign ownership of the IoT sensors to the gateway devices, wherein the cooperative coordination to rely on a coordination protocol among the gateway devices and on communication from the IoT sensors.

5. The IoT system of claim 4, wherein the communication from the IoT sensors comprises a beacon from the IoT sensors, and wherein the coordination protocol among the gateway devices comprises Bluetooth® Low Energy, routing protocol for low-power (RPL), optimized link state routing (OLSR) protocol, the better approach to mobile ad-hoc networking (BATMAN), or is per Institute of Electrical and Electronics Engineers (IEEE) 802.15.4, or any combinations thereof.

6. The IoT system of claim 1, wherein the coordinator comprises the IoT sensors to implement the decentralized coordination to decide and assign ownership of the IoT sensors to the gateway devices.

7. The IoT system of claim 6, wherein the coordinator does not comprise the gateway devices, and wherein the gateway devices do not decide the ownership.

8. The IoT system of claim 6, wherein the IoT sensors rely on a beacon from the gateway devices to decide the ownership.

9. A method of operating an Internet of Things (IoT) system, comprising:
    sensing data with IoT sensors;
    receiving at gateway devices the data from the IoT sensors;
    coordinating gateway device ownership of the IoT sensors according to a coordination mode; and
    selecting the coordination mode for coordinating gateway device ownership of the IoT sensors, wherein selection options for the coordination mode comprise a centralized coordination, a cooperative coordination, and a decentralized coordination.

10. The method of claim 9, comprising providing the data from the gateway devices to a server in a cloud.

11. The method of claim 9, wherein coordinating gateway device ownership of the IoT sensors comprises the gateway devices implementing the centralized coordination to decide and assign ownership of the IoT sensors to the gateway devices, the centralized coordination relying on a coordination protocol among the gateway devices.

12. The method of claim 9, wherein coordinating gateway device ownership of the IoT sensors comprises the gateway devices and the IoT sensors implementing the cooperative coordination to decide and assign ownership of the IoT sensors to the gateway devices, the cooperative coordination relying on a coordination protocol among the gateway devices and on a beacon from the IoT sensors.

13. The method of claim 9, wherein coordinating gateway device ownership of the IoT sensors comprises the IoT sensors implementing the decentralized coordination to decide and assign ownership of the IoT sensors to the gateway devices.

14. The method of claim 13, wherein the gateway devices do not decide the ownership.

15. The method of claim 13, wherein the IoT sensors implementing the decentralized coordination comprises the IoT sensors relying on communication from the gateway devices to decide the ownership.

16. The method of claim 15, wherein the communication from the gateway devices is a beacon from the gateway devices.

17. A tangible, non-transitory, computer-readable medium comprising code executable by a processor of an IoT device to direct the processor to:
    coordinate gateway device ownership of the IoT sensors according to a coordination mode, the IoT sensors to measure data and provide the data to gateway devices; and
    facilitate selection of the coordination mode to coordinate the gateway device ownership of the IoT sensors, wherein selection options for coordination mode comprise centralized coordination, cooperative coordination, and decentralized coordination.

18. The tangible, non-transitory, computer-readable medium of claim 17, wherein to coordinate gateway device ownership of the IoT sensors comprises implementing the centralized coordination by the gateway devices to decide and assign ownership of the IoT sensors to the gateway devices, the centralized coordination relying on a coordination protocol among the gateway devices.

19. The tangible, non-transitory, computer-readable medium of claim 17, wherein to coordinate gateway device ownership of the IoT sensors comprises the gateway devices and the IoT sensors implementing the cooperative coordination to decide and assign ownership of the IoT sensors to the gateway devices, the cooperative coordination relying on a coordination protocol among the gateway devices and on a beacon from the IoT sensors.

20. The tangible, non-transitory, computer-readable medium of claim 17, wherein to coordinate gateway device ownership of the IoT sensors comprises the IoT sensors implementing the decentralized coordination to decide and assign ownership of the IoT sensors to the gateway devices.

21. The tangible, non-transitory, computer-readable medium of claim 17, wherein the gateway devices do not decide the ownership.

22. The tangible, non-transitory, computer-readable medium of claim 17, wherein the IoT sensors implementing the decentralized coordination comprises the IoT sensors relying on a beacon from the gateway devices to decide the ownership.

* * * * *